(12) United States Patent
Shamir

(10) Patent No.: US 12,313,514 B2
(45) Date of Patent: *May 27, 2025

(54) DETECTION SCHEME FOR PARTICLE SIZE AND CONCENTRATION MEASUREMENT

(71) Applicant: Particle Measuring Systems, Inc., Boulder, CO (US)

(72) Inventor: Joseph Shamir, Haifa (IL)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 340 days.

This patent is subject to a terminal disclaimer.

(21) Appl. No.: 17/570,228

(22) Filed: Jan. 6, 2022

(65) Prior Publication Data
US 2022/0228963 A1    Jul. 21, 2022

Related U.S. Application Data

(63) Continuation of application No. 16/680,125, filed on Nov. 11, 2019, now abandoned, which is a
(Continued)

(51) Int. Cl.
| | |
|---|---|
| *G01N 15/0205* | (2024.01) |
| *G01N 15/06* | (2024.01) |
| *G01N 15/14* | (2024.01) |
| *G01N 15/1434* | (2024.01) |
| *G01N 15/075* | (2024.01) |

(52) U.S. Cl.
CPC ......... *G01N 15/0205* (2013.01); *G01N 15/06* (2013.01); *G01N 15/1434* (2013.01); *G01N 15/1436* (2013.01); *G01N 15/1456* (2013.01); *G01N 15/1459* (2013.01);
(Continued)

(58) Field of Classification Search
None
See application file for complete search history.

(56) References Cited

U.S. PATENT DOCUMENTS

| | | | |
|---|---|---|---|
| 4,540,283 A | 9/1985 | Bachalo | |
| 4,594,715 A | 6/1986 | Knollenberg | |

(Continued)

FOREIGN PATENT DOCUMENTS

| | | |
|---|---|---|
| AU | 2004256318 | 7/2004 |
| CN | 1587984 | 3/2005 |

(Continued)

OTHER PUBLICATIONS

Bouhelier et al. (2003) "Near-field scattering of longitudinal fields," Applied Physics Letters 82(25): 4596-4598.
(Continued)

*Primary Examiner* — Rufus L Phillips
(74) *Attorney, Agent, or Firm* — Leydig, Voit & Mayer, Ltd.

(57) ABSTRACT

The present invention provides a system and method of particle size and concentration measurement that comprises the steps of: providing a focused, synthesized, structured laser beam, causing the beam to interact with the particles, measuring the interaction signal and the number of interactions per unit time of the beam with the particles, and using algorithms to map the interaction signals to the particle size and the number of interactions per unit time to the concentration.

9 Claims, 6 Drawing Sheets

Related U.S. Application Data continuation of application No. 15/440,287, filed on Feb. 23, 2017, now Pat. No. 10,921,229, which is a continuation of application No. 14/359,233, filed as application No. PCT/IL2012/050488 on Nov. 29, 2012, now abandoned.

(52) U.S. Cl.
CPC ..... *G01N 15/075* (2024.01); *G01N 2015/145* (2013.01); *G01N 2015/1454* (2013.01)

(56) References Cited

U.S. PATENT DOCUMENTS

| | | |
|---|---|---|
| 4,690,561 A | 9/1987 | Ito |
| 4,783,599 A | 11/1988 | Borden |
| 4,798,465 A | 1/1989 | Knollenberg |
| 4,806,774 A | 2/1989 | Lin et al. |
| 4,854,705 A | 8/1989 | Bachalo |
| 4,893,928 A | 1/1990 | Knollenberg |
| 4,906,094 A | 3/1990 | Ashida |
| 4,917,494 A | 4/1990 | Poole et al. |
| 4,963,003 A | 10/1990 | Hiiro |
| 4,989,978 A | 2/1991 | Groner |
| 5,030,002 A | 7/1991 | North, Jr. |
| 5,063,301 A | 11/1991 | Turkevich et al. |
| 5,282,151 A | 1/1994 | Knollenberg |
| 5,283,199 A | 2/1994 | Bacon, Jr. et al. |
| 5,471,298 A | 11/1995 | Moriya |
| 5,532,943 A | 7/1996 | Asano et al. |
| 5,585,921 A | 12/1996 | Pepper et al. |
| 5,619,043 A | 4/1997 | Preikschat et al. |
| 5,660,985 A | 8/1997 | Pieken et al. |
| 5,671,046 A | 9/1997 | Knowlton |
| 5,719,667 A | 2/1998 | Miers |
| 5,726,753 A | 3/1998 | Sandberg |
| 5,739,527 A | 4/1998 | Hecht et al. |
| 5,740,079 A | 4/1998 | Shigemori et al. |
| 5,751,422 A | 5/1998 | Mitchell |
| 5,805,281 A | 9/1998 | Knowlton et al. |
| 5,861,950 A | 1/1999 | Knowlton |
| 5,889,589 A | 3/1999 | Sandberg |
| 5,903,338 A | 5/1999 | Mavliev et al. |
| 5,995,650 A | 11/1999 | Migdal et al. |
| 5,999,256 A | 12/1999 | Jones |
| 6,084,671 A | 7/2000 | Holcomb |
| 6,137,572 A | 10/2000 | DeFreez et al. |
| 6,167,107 A | 12/2000 | Bates |
| 6,246,474 B1 | 6/2001 | Cerni et al. |
| 6,256,096 B1 | 7/2001 | Johnson |
| 6,275,290 B1 | 8/2001 | Cerni et al. |
| 6,532,067 B1 | 3/2003 | Chang et al. |
| 6,615,679 B1 | 9/2003 | Knollenberg et al. |
| 6,709,311 B2 | 3/2004 | Cerni |
| 6,859,277 B2 | 2/2005 | Wagner et al. |
| 6,903,818 B2 | 6/2005 | Cerni et al. |
| 6,945,090 B2 | 9/2005 | Rodier |
| 7,030,980 B1 | 4/2006 | Sehler et al. |
| 7,088,446 B2 | 8/2006 | Cerni |
| 7,088,447 B1 | 8/2006 | Bates et al. |
| 7,092,078 B2 | 8/2006 | Nagai et al. |
| 7,208,123 B2 | 4/2007 | Knollenberg et al. |
| 7,235,214 B2 | 6/2007 | Rodier et al. |
| RE39,783 E | 8/2007 | Cerni et al. |
| 7,456,960 B2 | 11/2008 | Cerni et al. |
| 7,526,158 B2 | 4/2009 | Novotny et al. |
| 7,528,959 B2 | 5/2009 | Novotny et al. |
| 7,561,267 B2 | 7/2009 | Luo et al. |
| 7,576,857 B2 | 8/2009 | Wagner |
| 7,630,147 B1 | 12/2009 | Kar et al. |
| 7,667,839 B2 | 2/2010 | Bates |
| 7,746,469 B2 | 6/2010 | Shamir et al. |
| 7,796,255 B2 | 9/2010 | Miller |
| 7,876,450 B2 | 1/2011 | Novotny et al. |
| 7,916,293 B2 | 3/2011 | Mitchell et al. |
| 7,973,929 B2 | 7/2011 | Bates |
| 7,985,949 B2 | 7/2011 | Rodier |
| 8,027,035 B2 | 9/2011 | Mitchell et al. |
| 8,109,129 B2 | 2/2012 | Gorbunov |
| 8,143,600 B2 | 3/2012 | Seibel et al. |
| 8,154,724 B2 | 4/2012 | Mitchell et al. |
| 8,174,697 B2 | 5/2012 | Mitchell et al. |
| 8,427,642 B2 | 4/2013 | Mitchell et al. |
| 8,465,791 B2 | 6/2013 | Liu et al. |
| 8,605,282 B2 | 12/2013 | Groswasser |
| 8,705,040 B2 | 4/2014 | Trainer |
| 8,800,383 B2 | 8/2014 | Bates |
| 8,822,952 B2 | 9/2014 | Muto et al. |
| 8,869,593 B2 | 10/2014 | Gorbunov et al. |
| 9,063,117 B2 | 6/2015 | Gourley |
| 9,068,916 B2 | 6/2015 | Heng |
| 9,631,222 B2 | 4/2017 | Ketcham et al. |
| 9,638,665 B2 | 5/2017 | Gorbunov |
| 9,682,345 B2 | 6/2017 | Gromala et al. |
| 9,808,760 B2 | 11/2017 | Gromala et al. |
| 9,810,558 B2 | 11/2017 | Bates et al. |
| 9,857,284 B1 | 1/2018 | Javadi et al. |
| 9,885,640 B2 | 2/2018 | Ketcham et al. |
| 9,952,136 B2 | 4/2018 | Javadi et al. |
| 9,983,113 B2 | 5/2018 | Matsuda et al. |
| 9,989,462 B2 | 6/2018 | Lumpkin et al. |
| 10,078,045 B2 | 9/2018 | Diebold et al. |
| 10,197,487 B2 | 2/2019 | Knollenberg et al. |
| 10,288,546 B2 | 5/2019 | Diebold et al. |
| 10,345,200 B2 | 7/2019 | Scialo et al. |
| 10,345,246 B2 | 7/2019 | Tian et al. |
| 10,371,620 B2 | 8/2019 | Knollenberg et al. |
| 10,416,069 B2 | 9/2019 | Saitou et al. |
| 10,792,694 B2 | 10/2020 | Gorbunov et al. |
| 10,859,487 B2 | 12/2020 | Knollenberg et al. |
| 10,908,059 B2 | 2/2021 | Knollenberg et al. |
| 10,921,229 B2 | 2/2021 | Shamir |
| 10,928,293 B2 | 2/2021 | Knollenberg et al. |
| 10,997,845 B2 | 5/2021 | MacLaughlin et al. |
| 11,181,455 B2 | 11/2021 | Bates et al. |
| 11,215,546 B2 | 1/2022 | MacLaughlin et al. |
| 11,231,345 B2 | 1/2022 | Scialo et al. |
| 11,237,095 B2 | 2/2022 | Rodier et al. |
| 11,781,965 B2 | 10/2023 | Karasikov et al. |
| 11,892,462 B2 | 2/2024 | Scialo et al. |
| 11,927,509 B2 | 3/2024 | Scialo et al. |
| 11,946,852 B2 | 4/2024 | Rodier et al. |
| 11,988,593 B2 | 5/2024 | Ellis et al. |
| 2003/0030783 A1 | 2/2003 | Roche et al. |
| 2004/0011975 A1 | 1/2004 | Nicoli et al. |
| 2004/0021868 A1 | 2/2004 | Ortyn |
| 2004/0023293 A1 | 2/2004 | Kreimer |
| 2004/0036874 A1 | 2/2004 | Kramer et al. |
| 2005/0028593 A1 | 2/2005 | Rodier |
| 2005/0067337 A1 | 3/2005 | Hart et al. |
| 2005/0138934 A1 | 6/2005 | Weigert et al. |
| 2005/0179896 A1 | 8/2005 | Girvin et al. |
| 2007/0030492 A1 | 2/2007 | Novotny et al. |
| 2007/0165225 A1 | 7/2007 | Trainer et al. |
| 2007/0259440 A1 | 11/2007 | Zhou et al. |
| 2007/0263215 A1 | 11/2007 | Bachalo et al. |
| 2008/0037004 A1 | 2/2008 | Shamir et al. |
| 2008/0079929 A1 | 4/2008 | Luo et al. |
| 2009/0067035 A1 | 3/2009 | Foster et al. |
| 2009/0078862 A1 | 3/2009 | Rodier et al. |
| 2009/0128810 A1 | 5/2009 | Bates |
| 2009/0139311 A1 | 6/2009 | Lehto et al. |
| 2009/0190128 A1 | 7/2009 | Cerni et al. |
| 2009/0268202 A1 | 10/2009 | Wagner |
| 2009/0323061 A1 | 12/2009 | Novotny et al. |
| 2010/0220315 A1 | 9/2010 | Morell et al. |
| 2010/0304429 A1* | 12/2010 | Butler ............ B01L 3/502761 435/34 |
| 2010/0328657 A1 | 12/2010 | Dholakia et al. |
| 2012/0044493 A1 | 2/2012 | Smart et al. |
| 2012/0100521 A1 | 4/2012 | Soper et al. |
| 2013/0050782 A1 | 2/2013 | Heng et al. |
| 2014/0177932 A1 | 6/2014 | Milne et al. |
| 2014/0226158 A1 | 8/2014 | Trainer et al. |

(56) References Cited

U.S. PATENT DOCUMENTS

| | | |
|---|---|---|
| 2015/0000595 A1 | 1/2015 | Gorbunov et al. |
| 2015/0062587 A1 | 3/2015 | Shpaisman et al. |
| 2015/0233814 A1 | 8/2015 | Golovanevsky et al. |
| 2015/0259723 A1 | 9/2015 | Hartigan et al. |
| 2015/0260628 A1 | 9/2015 | Shamir |
| 2015/0276575 A1 | 10/2015 | Takeuchi et al. |
| 2015/0316464 A1 | 11/2015 | Gourley |
| 2016/0126081 A1 | 5/2016 | Gorbunov |
| 2016/0139013 A1 | 5/2016 | Gorbunov |
| 2016/0290915 A1 | 10/2016 | Chen et al. |
| 2016/0356711 A1 | 12/2016 | Lumpkin et al. |
| 2017/0059485 A1 | 3/2017 | Yamamoto et al. |
| 2017/0089826 A1 | 3/2017 | Lin |
| 2017/0176312 A1 | 6/2017 | Shamir |
| 2017/0191924 A1 | 7/2017 | Pristinski |
| 2017/0198782 A1 | 7/2017 | Rowlen et al. |
| 2017/0336328 A1 | 11/2017 | Gupta et al. |
| 2018/0038783 A1 | 2/2018 | Yamamoto et al. |
| 2018/0266938 A1* | 9/2018 | Chow ............... H01L 27/14609 |
| 2018/0269250 A1 | 9/2018 | Chow |
| 2018/0270434 A1 | 9/2018 | Chow |
| 2018/0270435 A1 | 9/2018 | Chow |
| 2018/0284008 A1 | 10/2018 | Kinishi et al. |
| 2018/0313796 A1 | 11/2018 | Jeannotte |
| 2018/0335376 A1 | 11/2018 | Ayliffe et al. |
| 2019/0025214 A1 | 1/2019 | Rothberg et al. |
| 2019/0204208 A1 | 7/2019 | Diebold et al. |
| 2019/0250785 A1 | 8/2019 | Pandolfi et al. |
| 2019/0277745 A1 | 9/2019 | Matsuda et al. |
| 2019/0346345 A1 | 11/2019 | Scialo et al. |
| 2020/0072729 A1 | 3/2020 | Lumpkin et al. |
| 2020/0150017 A1 | 5/2020 | Bates et al. |
| 2020/0150018 A1 | 5/2020 | Shamir |
| 2020/0156057 A1 | 5/2020 | Tomaras |
| 2020/0158603 A1 | 5/2020 | Scialo et al. |
| 2020/0240896 A1 | 7/2020 | Karasikov et al. |
| 2020/0355599 A1 | 11/2020 | Rodier et al. |
| 2021/0041364 A1 | 2/2021 | Yi et al. |
| 2021/0044978 A1 | 2/2021 | Michaelis et al. |
| 2021/0063349 A1 | 3/2021 | Rodier et al. |
| 2021/0102884 A1 | 4/2021 | MacLaughlin et al. |
| 2021/0104146 A1 | 4/2021 | MacLaughlin et al. |
| 2021/0136722 A1 | 5/2021 | Scialo et al. |
| 2021/0140867 A1 | 5/2021 | Knollenberg et al. |
| 2021/0190659 A1 | 6/2021 | Knollenberg et al. |
| 2021/0208054 A1 | 7/2021 | Ellis et al. |
| 2021/0223273 A1 | 7/2021 | Scialo et al. |
| 2021/0295670 A1 | 9/2021 | MacLaughlin et al. |
| 2021/0381948 A1 | 12/2021 | Rodier et al. |
| 2021/0404936 A1 | 12/2021 | Bates et al. |
| 2022/0057317 A1 | 2/2022 | Yamamoto et al. |
| 2022/0155212 A1 | 5/2022 | Rodier et al. |
| 2022/0364971 A1 | 11/2022 | Kondo et al. |
| 2022/0397495 A1 | 12/2022 | Yates et al. |
| 2022/0397510 A1 | 12/2022 | Yates et al. |
| 2022/0397519 A1 | 12/2022 | Knollenberg et al. |
| 2023/0009668 A1 | 1/2023 | Scialò et al. |
| 2023/0087059 A1 | 3/2023 | Knollenberg et al. |
| 2023/0236107 A1 | 7/2023 | Moghaddam et al. |
| 2024/0027326 A1 | 1/2024 | Karasikov et al. |
| 2024/0183759 A1 | 1/2024 | Scialò et al. |
| 2024/0133793 A1 | 4/2024 | Ellis et al. |
| 2024/0159787 A1 | 5/2024 | Scialò et al. |
| 2024/0219412 A1 | 7/2024 | Scialò et al. |

FOREIGN PATENT DOCUMENTS

| | | |
|---|---|---|
| CN | 1890595 A | 1/2007 |
| CN | 101153868 A | 4/2008 |
| CN | 103959039 A | 7/2014 |
| CN | 104969055 A | 10/2015 |
| CN | 108369170 A | 8/2018 |
| CN | 109642866 A | 4/2019 |
| EP | 1083424 | 3/2001 |
| EP | 1642113 | 4/2014 |
| JP | S57-037251 | 3/1982 |
| JP | H03002544 A1 | 1/1991 |
| JP | H03029835 A | 2/1991 |
| JP | H04188041 | 7/1992 |
| JP | H08-054388 | 2/1996 |
| JP | H0850089 A1 | 2/1996 |
| JP | H11118946 A1 | 4/1999 |
| JP | 2004184135 A1 | 7/2004 |
| JP | 2005536740 | 12/2005 |
| JP | 2010101879 A1 | 5/2010 |
| JP | 2011133460 | 7/2011 |
| JP | 6309896 | 4/2018 |
| KR | 10-2006-0132545 A | 8/2007 |
| WO | WO 98/50779 | 11/1998 |
| WO | WO 99/06823 | 2/1999 |
| WO | WO 2005/005965 | 1/2005 |
| WO | WO 2007/100615 A2 | 9/2007 |
| WO | WO 2013/181453 | 5/2013 |
| WO | WO 2013/080209 | 6/2013 |
| WO | WO 2017203224 A1 | 11/2017 |
| WO | WO 2018/170232 | 9/2018 |
| WO | WO 2018/170257 | 9/2018 |
| WO | WO 2019/082186 | 5/2019 |
| WO | WO 2019/171044 | 9/2019 |
| WO | WO 2020/219841 | 10/2020 |
| WO | WO 2021/102256 | 5/2021 |

OTHER PUBLICATIONS

Bouhelier et al. (2003) "Near-Field Second-Harmonic Generation Induced by Local Field Enhancement," Physical Review Letters 90(1): 013903-1-013903-4.
Bouhelier et al. (2003) "Plasmon-coupled tip-enhanced near-field optical microscopy," J. of Microscopy 210: 220-224.
European Extended Search Report, dated Jul. 13, 2021, corresponding to EP 18871675.7—10 pp.
European Office Action, dated Feb. 16, 2012, corresponding to European Patent Application No. 04744956.6, 5 pp.
European Office Action, dated Jan. 22, 2009, corresponding to European Patent Application No. 04744956.6, 2 pp.
European Office Action, dated Oct. 8, 2020, corresponding to European Patent Application No. 12854152.1, 8 pp.
European Office Action, dated Sep. 24, 2013, corresponding to European Patent Application No. 04744956.6, 7 pp.
Friedmann et al. (1996) "Surface Analysis Using Multiple Coherent Beams," Electrical and Electronics Engineers in Israel, 537-540.
Friedmann et al. (1997) "Resolution enhancement by extrapolation of the optically measured spectrum of surface profiles," Appl. Opt. 36(8): 1747-1751.
Goldberg et al. (2002) "Immersion Lens Microscopy of Photonic Nanostructures and Quantum Dots," IEEE Journal of Selected Topics in Quantum Electronics 8(5): 1051-1059.
Hemo et al. (Jan. 1, 2011) "Scattering of singular beams by subwavelength objects," Applied Optics 50(1):33-42.
Ignatovich et al. (2006) "Real-Time and Background-Free Detection of Nanoscale Particles," Physical Review Letters 96(1): 013901-1-013901-4.
"Innovative On-Line Particle Analyzer," (Jun. 2012) Innovative Particle-Monitoring Technologies Poster, 1 pp.
International Preliminary Report on Patentability corresponding to PCT/IL2004/000616, issued Oct. 24, 2005.
International Preliminary Report on Patentability corresponding to PCT/IL2012/050488, issued Jun. 3, 2014.
International Search Report and Written Opinion corresponding to PCT/IL2004/000616, issued Nov. 12, 2004.
International Search Report and Written Opinion corresponding to PCT/IL2012/050488, issued Mar. 21, 2013.
International Search Report and Written Opinion corresponding to PCT/IL2018/051141, issued Feb. 21, 2019, 16 pages.
International Search Report and Written Opinion, dated Feb. 26, 2021, corresponding to International Patent Application No. PCT/US2020/061493, 12 pages.
International Search Report and Written Opinion, dated Jul. 28, 2020, corresponding to International Patent Application No. PCT/US2020/029765, 11 pages.

(56) References Cited

OTHER PUBLICATIONS

Japanese Search Report corresponding to Application No. 2014-544046, issued Jul. 28, 2016.
Jones (1999) "Light scattering for particle characterization," Progress in Energy and Combustion Science 25(1): 1-53.
Matizen et al. (1987) "Formation of non-gaussian light beams with the aid of a spatially inhomogeneous amplitude filter," Soviet Journal of Quantum Electronics 17(7): 886-887.
"Nano-particle analysis using dark laser beam sensor," (Jun. 2014) Innovative Particle-Monitoring Technologies Poster, 1 pp.
Notice of Allowance corresponding to Korean Patent Application No. 10-2014-7017139, dated Feb. 18, 2020, 3 pp.
Notice of Preliminary Rejection corresponding to Korean Patent Application No. 10-2014-7017139, dated Sep. 23, 2019.
Notification of Reason for Refusal corresponding to Korean Patent Application No. 10-2014-7017139, dated Nov. 22, 2018, 9 pp.
Notification of Reasons for Refusal corresponding to Japanese Patent Application No. 2014-544046, drafted Aug. 28, 2017.
Notification of Reasons for Refusal corresponding to Japanese Patent Application No. 2014-544046, drafted Sep. 26, 2016.
Office Action (First) corresponding to Chinese Patent Application No. 201280059154.7, issued Jun. 17, 2015.
Office Action (Second) corresponding to Chinese Patent Application No. 201280059154.7, issued May 9, 2016.
Piestun (2001) "Multidimensional Synthesis of Light Fields," Optics and Photonics News 12(11): 28-32.
Piestun et al. (1994) "Control of wave-front propagation with diffractive elements," Opt. Lett. 19(11):771-773.
Piestun et al. (1996) "Unconventional Light Distributions in three-dimensional domains," J. Mod. Opt. 43(7): 1495-1507.
Piestun et al. (1996) "Wave fields in three dimensions: Analysis and synthesis," J. Opt. Soc. Am. A 13(9): 1837-1848.
Piestun et al. (1998) "Pattern generation with extended focal depth," Appl. Opt. 37(23): 5394-5398.
Piestun et al. (2002) "Synthesis of three-dimensional light-fields and applications," Proc. IEEE 90(2): 222-244.
Search Opinion corresponding to European Patent Application No. 12854152.1, completed Jun. 2, 2015.
Shamir (Jul. 2012) "Singular beams in metrology and nanotechnology," Optical Engineering 51(7): 073605-1-073605-8.
Shamir et al. (2011) "Singular beams in metrology and nanotechnology," Tribute to Joseph W. Goodman, SPIE 8122(1): 1-8.
Shamir et al. (May 2013) "Novel particle sizing technology," 6 pp.
Spektor et al. (1996) "Dark beams with a constant notch," Opt. Lett. 21(7):456-458.
Supplementary Search corresponding to Chinese Patent Application No. 2012800591547, Apr. 28, 2016.
Weiner et al. (1998) "Improvements in Accuracy and Speed Using the Time-of-Transition Method and Dynamic Image Analysis for Particle Sizing," American Chemical Society, Chapter 8: 88-102.
Zhang et al. (Feb. 2019) "Modulated charge transport characteristics in solution-processed UV photodetector by incorporating localized built-in electric field," J. Alloys and Compounds, 774, 887-895.
Munster et al. (2002) "Interferometry in flow to sort unstained X- and Y-chromosome-bearing bull spermatozoa " Cytometry 47: 192-199.

\* cited by examiner

Fig. 3A              Fig. 3B
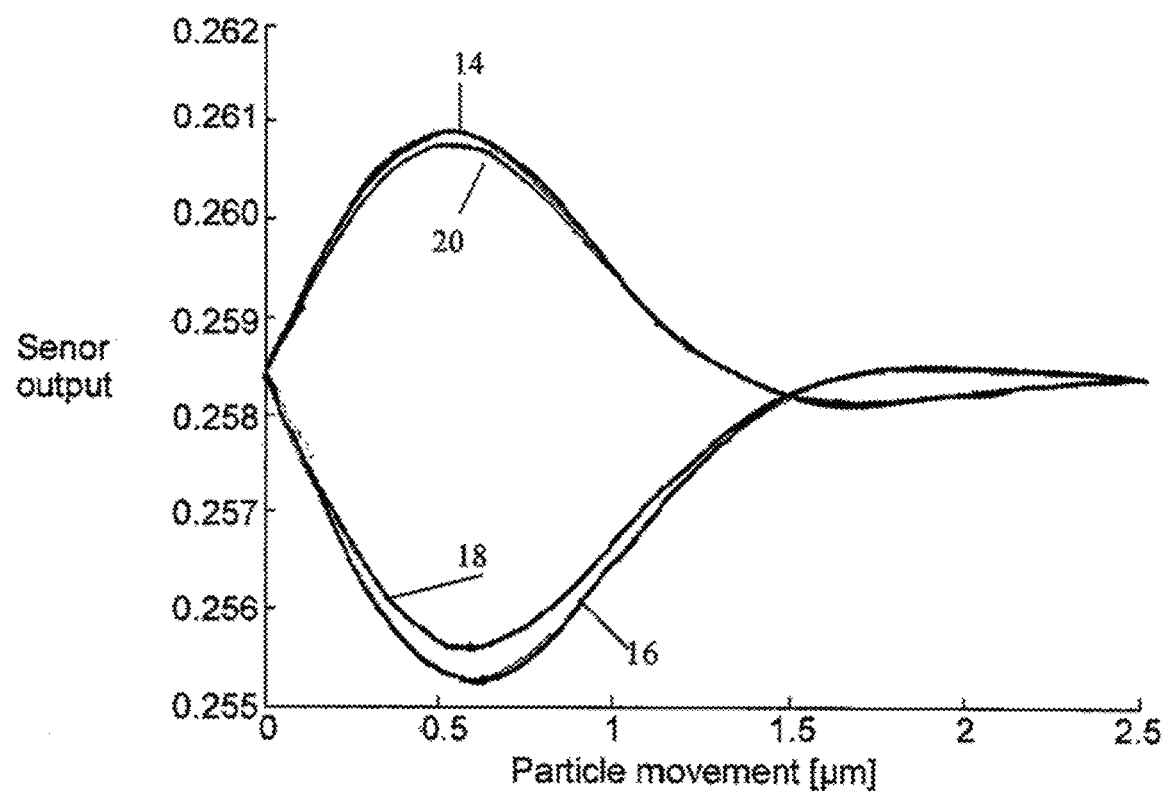
Fig. 4

DETECTION SCHEME FOR PARTICLE SIZE AND CONCENTRATION MEASUREMENT

CROSS REFERENCE TO RELATED APPLICATIONS

This patent application is a Continuation of U.S. patent application Ser. No. 16/680,125, filed Nov. 11, 2019; which is a Continuation of U.S. patent application Ser. No. 15/440,287, filed Feb. 23, 2017, now U.S. Pat. No. 10,921,229, issued Feb. 16, 2021; which application is a Continuation of U.S. patent application Ser. No. 14/359,233, filed on May 19, 2014; which was a National Phase of PCT international application number PCT/IL2012/050488, having an international filing date of Nov. 29, 2012, published as International Publication number WO 2013/080209; which claimed priority and the benefit from U.S. provisional patent application No. 61/565,529, filed on Dec. 1, 2011; all of which are hereby incorporated by reference in their entirety.

FIELD OF THE INVENTION

The present invention is related to the field of measuring particle size and concentration. More specifically it relates to the use of optical methods for measuring particle size and concentration.

BACKGROUND OF THE INVENTION

Many techniques exist for particle size and concentration analysis (PSA), they can be reviewed for reference in the book by Terry Alan "Introduction to Particle Size Analysis" T. Allen, Particle size analysis John Wiley & Sons; ISBN: 0471262218; June, 1983. The most commonly used techniques are optical, based on the interaction of the measured particles with laser radiation. Especially when approaching the particle size range around 1 micron and below, most of these techniques suffer from inaccuracies due to the effect of the real and imaginary part of the particle's refractive index. It is known, for example, that in some techniques, such as techniques based on Fraunhoffer diffraction analysis, light absorbing particles would be over sized due to energy loss resulting from the absorption, while in high concentration, particles would be under sized due to secondary scattering etc. An optical technique that is less sensitive to these problems is known as Time of Transition or TOT. In this technique the interaction of a scanning, focused laser beam and the particles is analyzed in the time domain rather than in the amplitude domain, resulting in lower sensitivity to variation in the refractive index. A detailed description of the technique appears in a paper "Improvements in Accuracy and Speed Using the Time-of-Transition Method and Dynamic Image Analysis For Particle Sizing by Bruce Weiner, Walter Tscharnuter, and Nir Karasikov", [Particle Size Distribution III; Assessment and Characterization; Editor(s): Theodore Provder1; Volume 693, Publication Date (Print): Jun. 10, 1998; Copyright © 1998 American Chemical Society]. To a great extent, in this technique a deconvolution algorithm of the known laser beam profile from the interaction signal derives the size. The concentration is derived from the number of interactions per unit time within the known volume of the focused laser beam.

The interaction of the particles in the TOT technique is with a focused scanning laser beam. In order to measure smaller particles, a smaller focused spot should be used. However according to diffraction laws for a Gaussian laser beam, if the beam's waist is D, the divergence of the beam is proportional to $\lambda/D$ where $\lambda$ is the laser's wavelength. The trade-off between the ability to resolve small particles, to the focus volume and the accuracy in measuring concentration is obvious. Thus if the TOT technique is targeted to resolve and measure particles in the micron and sub-micron range it would be limited in its ability to measure low concentrations as the instantaneous focus volume is small and the interaction rate of particles is low. On the other hand, taking a larger spot will improve the concentration measurement rate but will degrade the quality and resolution of the size analysis.

An improvement could be achieved by using a shorter wavelength. This could have a limited effect of as high as a factor of 2 only since going to too short a wavelength will result in absorption of the laser light by the optics and, in the case of particles in liquid, also absorption by the liquid.

A previous invention by the inventors (U.S. Pat. No. 7,746,469) introduced a new technique and means to decouple between the two contradicting requirements: the ability to resolve small particles and the ability to measure low concentration using measurements based on single particle interactions using a structured laser beam.

It is therefore a purpose of the present invention to provide new detection schemes offering higher sensitivity due to lower particle diameter dependency of the interaction signal.

It is another purpose of the present invention to provide new detection schemes offering the ability to measure higher particle concentration due to inherent optical noise filtration.

It is another purpose of the present invention to provide new detection schemes offering the ability to characterize particles by their interaction signal both in forward and in back scatter.

Further purposes and advantages of this invention will appear as the description proceeds.

SUMMARY OF THE INVENTION

The present invention provides a system and method of particle size and concentration measurement that comprises the steps of: providing a focused, synthesized, structured laser beam, causing the beam to interact with the particles, measuring the interaction signal and the number of interactions per unit time of the beam with the particles, and using algorithms to map the interaction signals to the particle size and the number of interactions per unit time to the concentration.

The particles can be fluid borne, airborne, or on a surface and have a size ranging from sub-micron to thousands of microns. In a preferred embodiment of the invention, the focused, synthesized, structured laser beam is a dark beam.

The structured beam can be generated by employing a mask over a Gaussian laser beam, by directly modifying the laser cavity, by combining the beams from several lasers, or by other manipulations of the laser beam such as in an interferometric or polarization modification scheme. The measurements can be made using the duration of interaction with a scanning beam, including dark field. The invention further provides a system for particle size and concentration measurement.

An alternative approach, which has the advantage of not using any moving parts to scan the beam, is to cause the particles to cross focal region of a focused laser beam.

Other aspects of the invention relate to an improved detection scheme capable of better particle characterization according to the forward and back scatter, detect particle fluorescence and measure the particle velocity.

The present invention introduces new detection schemes offering: higher sensitivity due to lower particle diameter dependency of the interaction signal (much lower than $r^4$ to $r^6$ as with conventional scattering of sub wavelength particles); the ability to measure higher particle concentration due to inherent optical noise filtration; the ability to characterize particles by their interaction signal in forward and back scatter, for example to discriminate between bubbles and particles flowing in a liquid; the ability to measure fluorescence from particles; and the ability to measure the particle's velocity. The latter enables a scanner free system where the flow of particles is either at a known velocity or the velocity of each particle is intrinsically measured.

The invention is a particle monitoring system comprising a laser that generates a Gaussian beam; means for converting the Gaussian laser beam into a structured dark beam; a focusing lens that focuses the dark beam onto particles moving through the illuminating dark beam; and two detectors. One of the two detectors is positioned over each intensity lobe of the dark beam.

The particle monitoring system of the invention is arranged such that the particles move through the illuminating dark beam in a direction at an angle of 90 degrees relative to the direction of the dark beam.

The signals from the two detectors are recorded in at least one of the following ways:
a) as separate signals;
b) as a differential signal of the two detector signals; and
c) as the sum of the two detector signals.

Embodiments of the particle monitoring system of the invention comprise a beam splitter and a second set of detectors oriented in a perpendicular direction to the dark line of the dark beam.

Embodiments of the particle monitoring system of the invention comprise a beam splitter and a third detector arranged to allow simultaneous measurement of back scattered radiation from the particles.

All the above and other characteristics and advantages of the invention will be further understood through the following illustrative and non-limitative description of embodiments thereof, with reference to the appended drawings. In the drawings the same numerals are sometimes used to indicate the same elements in different drawings.

BRIEF DESCRIPTION OF THE DRAWINGS

FIG. 3(a) and FIG. 3(b) show typical signals measured by the two detectors in the system of FIG. 1;

FIG. 4 is a scattering simulation showing half of the signals detected by the two detectors of the system of FIG. 1 for air bubbles and latex particles in water;

DETAILED DESCRIPTION OF EMBODIMENTS OF THE INVENTION

Figure 1:
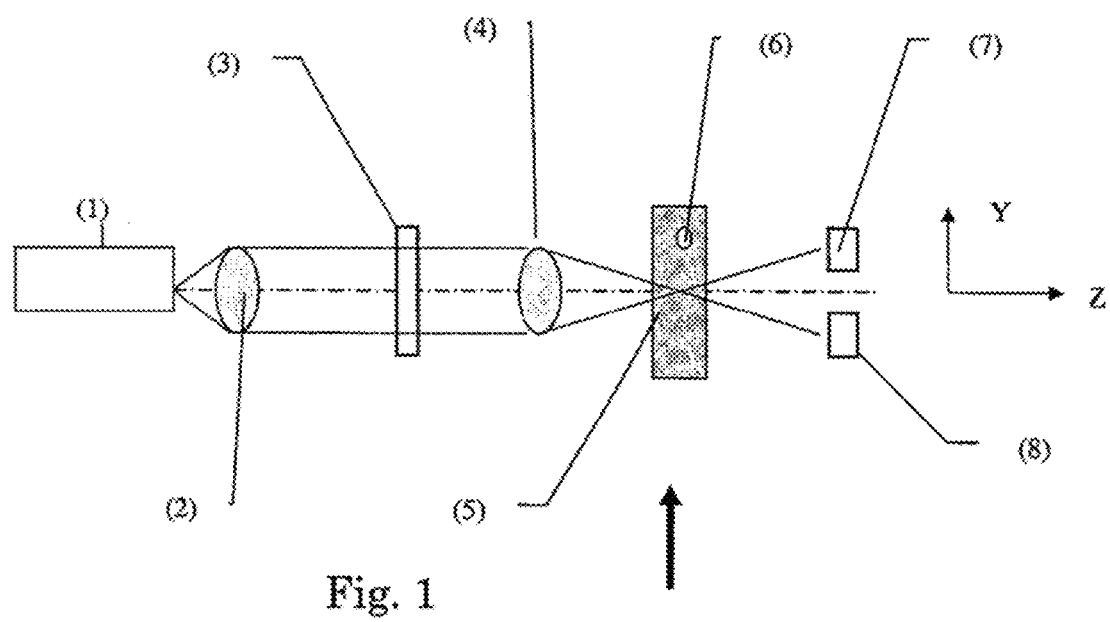
FIG. 1 schematically shows an embodiment of a particle monitoring system.
Figure 2:
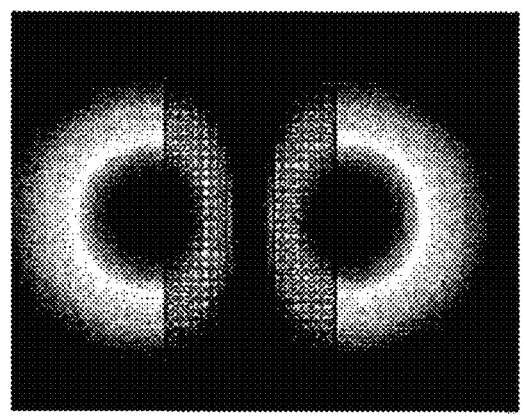
FIG. 2 shows the positioning of the detectors of the system of FIG. 1 with respect to the illuminating dark beam pattern.

FIG. 1 schematically shows an embodiment of a particle monitoring system. The system shown in FIG. 1 comprises a laser (1), which generates a Gaussian beam; collimating lens (2); phase mask (3), which converts the Gaussian laser beam into a structured dark beam; a focusing lens (4), which focuses the dark beam inside a cuvette (5) through which water containing particles (6) flows in the direction of the arrow; and two detectors (7) and (8). It is noted that in the case of airborne particles, the air stream bearing the particles need not be confined within a cuvette. The positioning of the detectors with respect to the illuminating dark beam pattern is shown in FIG. 2. In this embodiment one detector is positioned over each intensity lobe of the original dark beam. As particles cross the beam the output intensity pattern is modified and the detectors sense the change. The detector spacing can be optimized for sensitivity by aligning it to the maximum intensity gradient of the dark beam. For various analytic purposes the detector signals can be recorded either as:
a) separate signals;
b) as a differential signal of the two detector signals; and
c) as the sum of the two detector signals.

Figure 12:
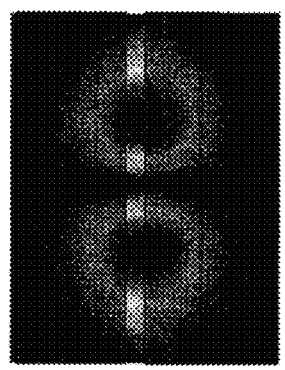
FIG. 12 shows the positioning of the detectors with respect to the illuminating dark beam pattern in an embodiment of the system of the invention that comprises a second set of two forward detectors and a beam splitter oriented in a perpendicular direction to the dark line of the dark beam.

In another embodiment, a second set of two forward detectors is used via a beam splitter in a perpendicular direction to the dark line of the dark beam. These two detectors are large relative to the beam size and integrate the total beam intensity. FIG. 12 shows the positioning of the second set of detectors with respect to the illuminating dark beam pattern in this embodiment, By checking the symmetry of the signals from these two detectors, one can derive if a particle has crossed the focal zone along its diameter (signals are equal), or along a chord (signals are different) as well as important information on the particle size like the width of the interaction or the depth of modulation in the signal. The timing of these two signals provides information also on the alignment of the particle flow direction and to what extent it is laminar and perpendicular to the optical axis.

Typical signals measured by the two detectors in the system of FIG. 1 are shown in FIG. 3(a) and FIG. 3(b). In these figures the signals measured by detector 1 (7) are identified by numeral (10) and those by detector 2 (8) are identified by numeral (12). For proper signal interpretation it is necessary to confirm that the particle crossed the beam along the focal plane. According to the present invention the signals of the two detectors appear simultaneously when the particle crosses the beam at focus, as shown in FIG. 3a. If the particle does not cross along the focal plane one detector signal is delayed with respect to the other one as is shown in FIG. 3b. The shift direction determines also whether the particle crosses the beam before or after the focus. It should be noted that the shape of the signal represents intrinsic particle characteristics.

Since the detector signals qualitatively represent interferometric response they react to the phase modulation by the moving particles. Thus, a particle with refractive index larger than the surrounding medium, e.g. latex in water, will induce, as an example, first a negative signal in detector 1 and a positive signal in detector 2 while a particle with refractive index smaller than the medium (bubble in water) will generate the opposite signal. It should be noted that the main feature is the opposing signals. By changing the detectors order positive/negative could be reversed. FIG. 4 shows half of the simulated signals in the forms of graphs showing detector output vs. the distance moved by the particles for air bubbles and latex particles in water. As a consequence, it is possible to distinguish bubbles from particles. In the figure, curve (14) shows the signal from sensor 1 for air in water; curve (16) shows the signal from sensor 2 for air in water; curve (18) shows the signal from sensor 1 for latex in water; and curve (20) shows the signal from sensor 2 for latex in water.

Figure 5:
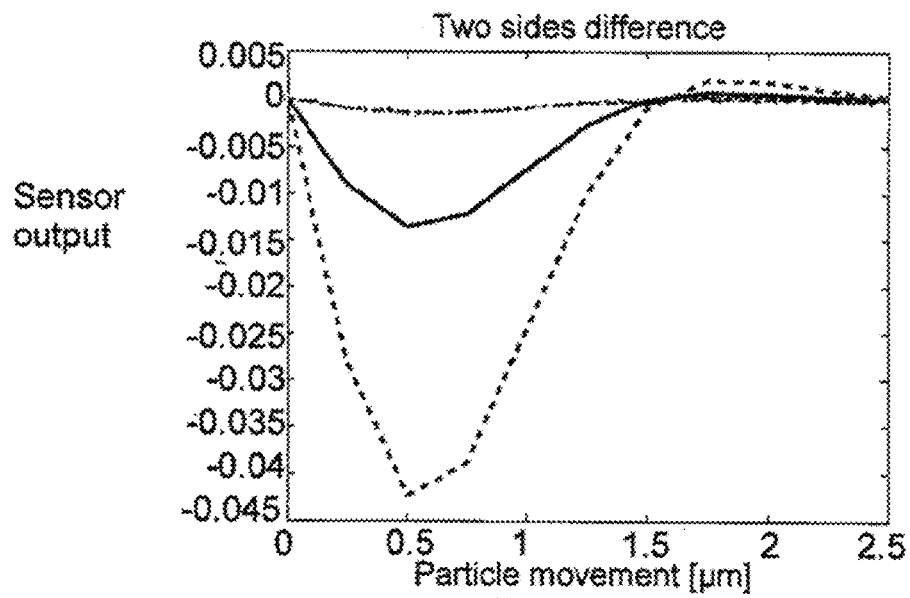
FIG. 5 shows simulated signals for the difference between the signals from the two detectors of FIG. 1 as particles of various size move from the center outward.

Another important aspect of the present invention is a detection scheme with a lower signal intensity dependence on the particle radius r. According to the classical scattering theory, the energy scattered behaves according to $r^4$ or even $r^6$ while in the present invention the signal is a result of a phase shift and the r dependence is between $r^2$ to $r^3$. FIG. 5 is an example of a simulation showing the dependence of the difference signal, i.e. the difference between the signals of the two detectors for three particles of different size (r=50 nm—dotted line; r=100 nm—solid line; r=200 nm—dashed line) moving out from the center of the dark beam pattern shown in FIG. 2. The advantage over the prior art provided by the invention is of a lower required detector dynamic range and a simpler detection scheme. The challenge of having a detector with a dynamic range of 1:10,000 to 1:1,000,000, as needed according to Rayleigh to detect particles in the range 0.1 to 1 micron, is clear to anyone familiar with the art.

For particles typically larger than the spot size, the intensity on the two detectors will reach a plateau and the measuring parameter will be the detectors summation width, which is proportional to the particle size.

Figure 6:
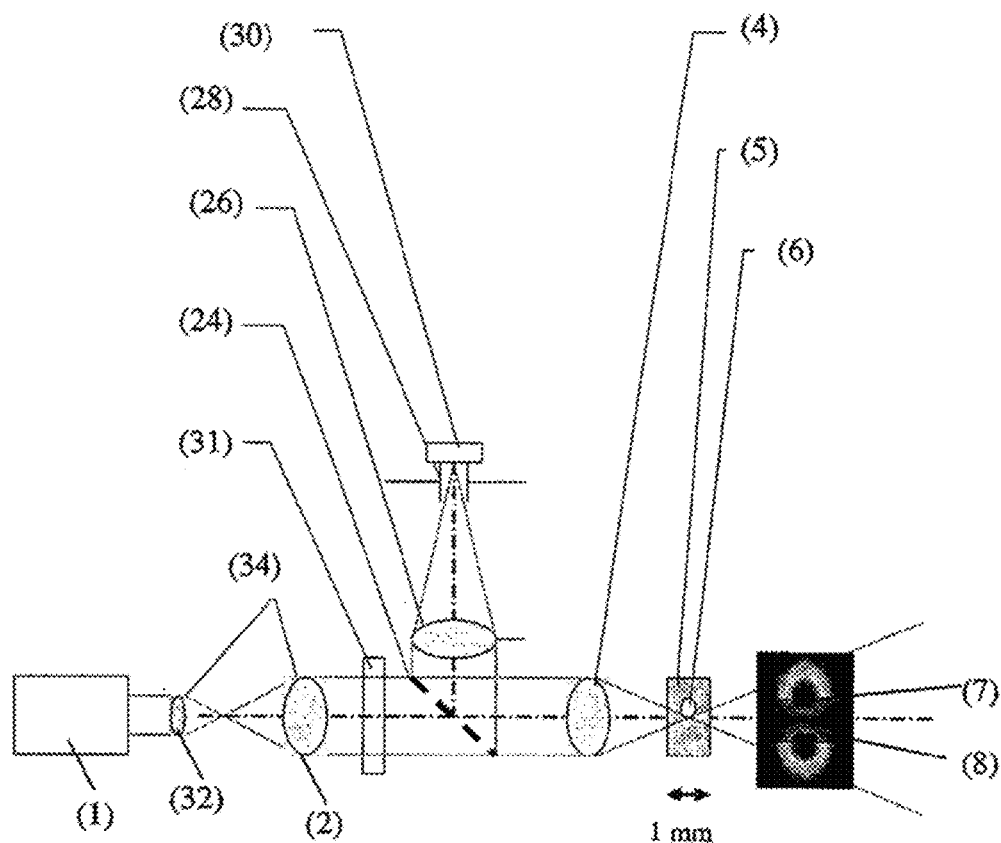
FIG. 6 schematically shows an embodiment of the detector system of FIG. 1 that has been modified to allow also the measurement of backscattering of radiation from the particles.

FIG. 6 schematically shows an embodiment of the detector system of FIG. 1 that has been modified to allow measurement of backscattering of radiation from the particles. The setup is as explained herein above for FIG. 1 with the addition of a beam splitter (24), collecting lens (26), pinhole (28), and the back scatter detector (30). The back scatter radiation from a particle (6) in the focus of the focusing lens (4) is collected by the focusing lens (4), collimated, reflected by beam splitter (24), and directed via the collecting lens (26), which focuses the radiation through pinhole (28) onto the back scatter detector (30). In addition another lens (32) has been added, as may be needed by the type of laser output, between the laser (1) and collimating lens (2) such that lens (32) and (2) act together as a beam expander (34).

In the present invention the back scatter detector has four roles:

The obvious use of back scatter detector (30) is in a confocal detection scheme to verify that the interaction with the particle was indeed in focus.

To provide additional size information, where, for particles smaller than the dark spot, the dark beam modulation is inversely proportional to the particle size. On the other hand, for particles larger than the dark spot and moving with constant velocity, the interaction duration is proportional to the particle size.

The back scattering interaction adds another dimension for differentiation among particle groups based on the fine details of the interaction fingerprint, which could include reflection properties.

The back scatter detector can detect fluorescence generated by the illuminating beam. In this application the beam splitter (24) is replaced by a dichroic mirror that would reflect the fluorescent light to the BS detector. The ability to measure the fluorescent light in parallel to the detection with the forward detectors, adds a powerful classification tool in cases in which the particle population was stained with a fluorescent stain. This is extremely applicable to Algae to help characterize the algae type or to the detection of pathogenic organisms.

A combination of a beam splitter and a dichroic mirror would allow to detect by two back scatter detectors the back scattered light and the fluorescent light.

The two forward signals and the optional back scatter signals (with and without Fluorescence) are single particle interactions with a high resolution laser focused beam. These interactions function as a high resolution one dimensional scanning laser microscope and provide a lot of information on the particle infrastructure. This information could be used to characterize specific particles. Particles of the same size but different internal structure will have the same interaction width but the internal interaction pulse behavior will differ and be like a "fingerprint" of the particle. An example of how the invention can be used for classification by clustering is shown in FIG. 7 for algae.

Figure 7:
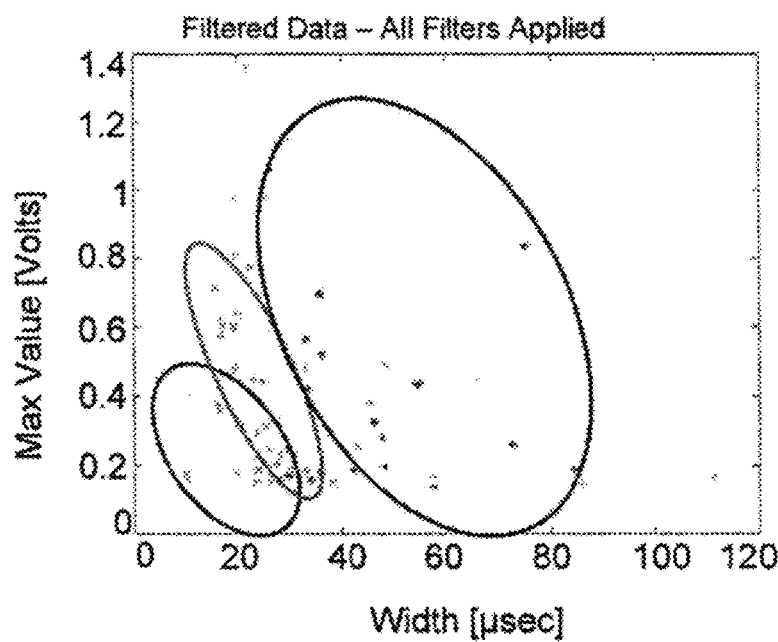
FIG. 7 shows an example of how the invention can be used for classification by clustering.

FIG. 7 shows the data in a two dimensional feature space. A set of interactions were acquired for 3 different types of Algae: Chlorela, Tetrahedron, and Pediastrum (indicated in the figure respectively by x, +, and *). Validation filters on the interaction signals, including symmetry of the two channels; interaction rise time, and others were applied. The Validation filters assure that the interaction is in the focal zone of the dark beam. Tests were conducted with various sub sets of filters but FIG. 7 presents the data when all validation filters were applied. Features are extracted from the interactions that qualified the validation filters and show the clustering of the different types of algae.

Although the feature space is multi-dimensional, FIG. 7 presents a 2D scatter diagram wherein the X axis is the interaction pulse width in microseconds and the Y axis the maximal signal per interaction as detected by the detectors. Already in this 2D presentation there is a clear grouping of the different algae types. To help manifest this grouping ellipses were outlined in the figure to indicate the boundaries between the groups. In this 2D presentation there is still some overlap, which could be reduced in a multi-dimensional feature space. Artificial Intelligence clustering techniques are then used, in the multi dimensional space, to identify the boundaries.

The application of this mechanism is such that once the clusters of known algae are established, it is possible to monitor, for example, water contaminated with algae and detect in a mixture whether algae complying with the clusters appear. This would give real time information on the algae population and feedback to any process attempting to reduce the algae population.

While the capability of the invention is demonstrated herein on algae, it can be used with all its detection options described above, to train the system on other events, such as pathogenic organisms and upon appearance of an event complying with the cluster of the said organism an alarm signal will be triggered. The analogy is drawn to a fingerprint, where objects of the same group will have commonality in the feature space and could be identified via this commonality in the same way a person is identified by his fingerprint.

Figure 8:
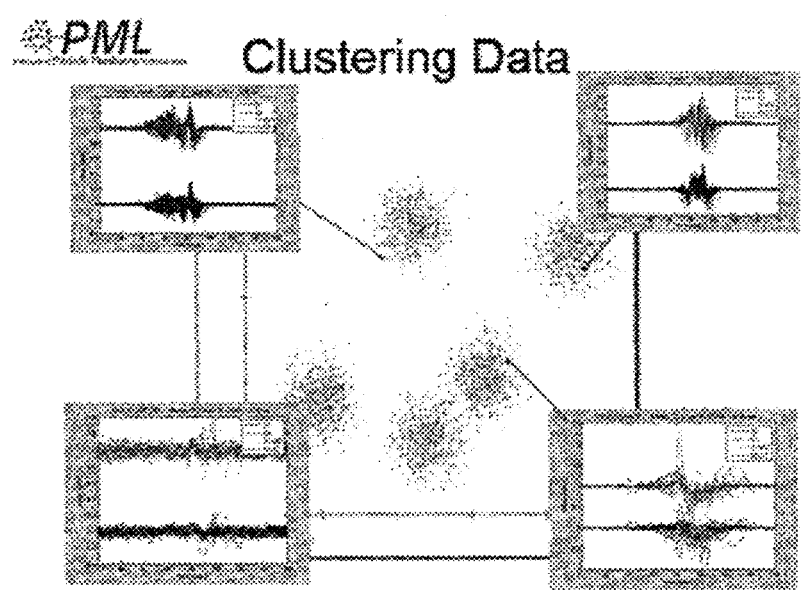
FIG. 8 shows an example of multi-dimensional clustering using an un-supervised learning method.

The classification by clustering approach can be extended to a multi-dimensional space using artificial intelligence tools to teach the system the nature of specific events and then to monitor for the presence of such events. One embodiment of the invention is to cluster the detectors signals by un-supervised learning (Visit http://www.autonlab.org/tutorials/ for Andrew's repository of Data Mining tutorials.). FIG. 8 shows an example of multi-dimensional clustering using an un-supervised learning method.

Figure 9:
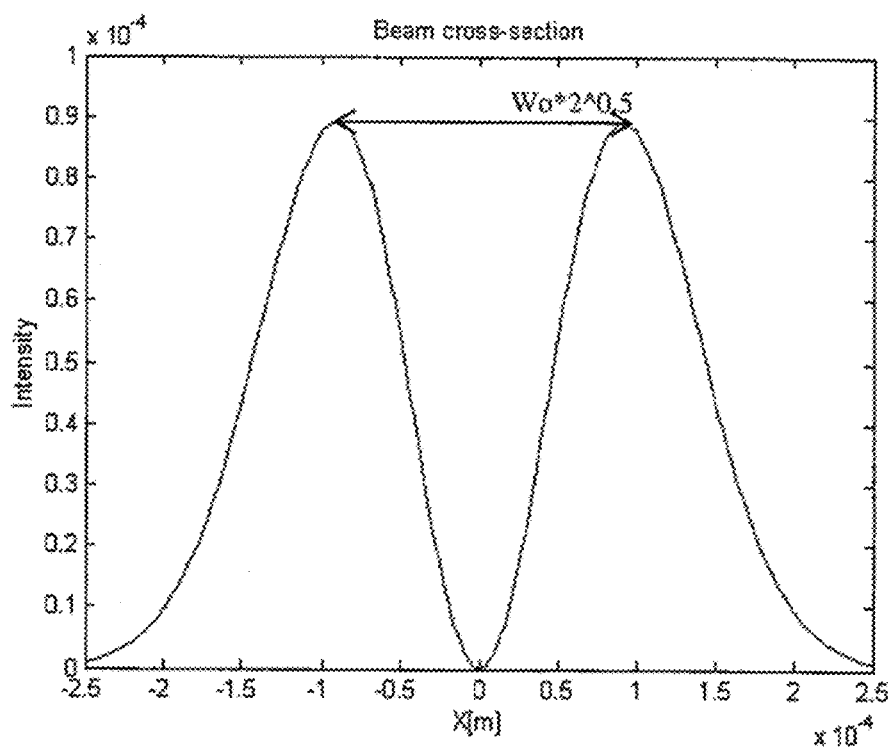
FIG. 9 schematically shows the profile of the dark beam.
Figure 11:
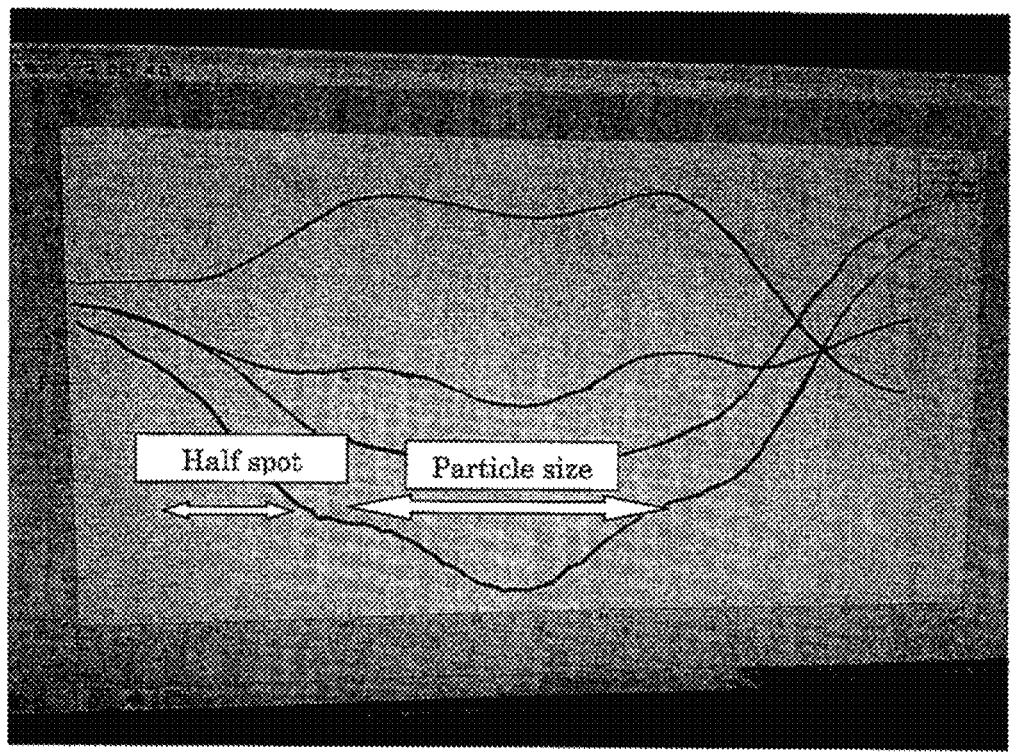
FIG. 11 is a screen shot showing two shoulders in the interaction signal, which correspond to half the spot size.

The measuring systems of FIG. 1 and FIG. 6 can be used to measure the intrinsic velocity of the particles moving through the cuvette. This is possible because the interaction signal duration is scaled inversely to the particles velocity. While in some configurations a constant and known velocity could be achieved a more general approach of the present invention is to extract the velocity information from the intrinsic information in the interaction signal. This is done by accounting for the profile (shown schematically in FIG. 9) of the dark beam. The distance between the intensity peaks of the lobes of the beam profile is equal to $WO*2^{0.5}$, where WO is the Gaussian waist. This value is known and hence can be used to measure the crossing particle velocity, while the modulation depth is used to extract the size information. This is applicable for small particles where the "lens effect" of the particle is negligible. For larger particles there will be 2 shoulders in the interaction signal which correspond to half the spot size, as shown in FIG. 11.

Many particle monitoring applications are characterized by a large population of very small particles, doped with slightly larger particles. Examples could be colloids; CMP slurry; crystallization processes and more. The ratio of the tail concentration of the slightly larger particles could be $10^6:1$ or so smaller compared to the main concentration. The state of the art instrumentation today is practically blind to these small concentrations. While small and challenging to measure, this small tail could cause damages and scratches in the case of CMP or other processes. The present invention offers the ability to measure concentrations which are $10^6:1$ smaller in this tail. The spot size is selected such that the majority of the population is filtered out and becomes a background noise while the larger particles are shown as clear interactions.

Figures 10A, 10B:
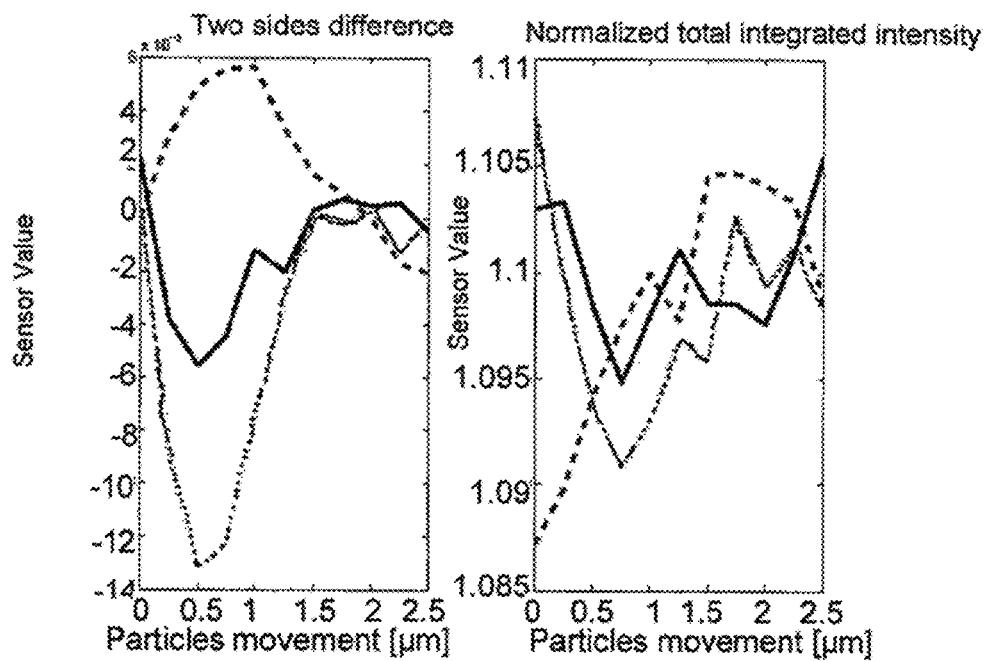
FIG. 10A shows the differential signal of the two detector signals for three illuminating beam structures in the presence of noise and the advantage of the dark beam in suppressing common noise.
FIG. 10B shows the summation signal of the two detector signals for same three illuminating beam structures as in FIG. 10A.

The present invention, based on the dark beam illumination in conjunction with recording the detector signals as a differential signal of the two detectors is extremely robust to the background noise and can facilitate detection in a high level of background noise. This robustness is illustrated by the simulations presented in FIG. 10A and FIG. 10B. FIG. 10A shows the differential signal on an arbitrary scale while a 200 nm particle crosses the beam from the center for three illuminating beam structures: Gaussian (dashed lines), Gauss-Laguerre (solid lines), and Dark beam (dotted lines).

FIG. 10B is similar to FIG. 10A but for the summation of the two detector signals. The simulations were conducted under semi-dynamic noise containing 10% of the total illuminating power and the other optical parameters in the simulation were as follows:

NA=0.125
$\lambda$=400 nm

In FIG. 10A a signal higher by a factor of two is achieved for the dark beam compared to the signals for the other two beam structures. The difference in sign of the curves is not material and depends on the order of the detectors in the subtraction relative to the particle direction.

Bearing in mind the larger spot and depth of field of the dark beam compared to the Gaussian beam, for achieving a valid measurement of particles smaller than spot, the noise immunity is even more apparent. The significant advantage in the noise reduction of the differential configuration (FIG. 10A) as compared to the summation configuration (FIG. 10B) is obvious.

In actual measurements a measurement set-up based on the present invention was able to detect the tail of larger particles, the concentration of which was $10^6$ times smaller in concentration than the main population of the smaller particles.

Although embodiments of the invention have been described by way of illustration, it will be understood that the invention may be carried out with many variations, modifications, and adaptations, without exceeding the scope of the claims.

The invention claimed is:

1. A particle monitoring system comprising:
   a flow cell including a particle interrogation region;
   a light source configured to produce a laser beam directed at the particle interrogation region, the laser beam having first and second intensity regions;
   a first detector positioned to detect forward scatter of the first intensity region of the beam after the beam has passed through the particle interrogation region, the first detector configured to produce a first signal; and
   a second detector, spaced apart from the first detector and positioned to detect forward scatter of the second intensity region of the beam after the beam has passed through the interrogation region, the second detector configured to produce a second signal; wherein the first signal and the second signal are used to generate a differential signal; and
   a validation filter configured to analyze the rise time of the differential signal, wherein the validation filter is configured such that a detected interaction between a particle and the beam occurs in a focal zone of the beam; and
   wherein a spot size of the laser beam is selected such that a majority of a population of particles flowing through the flow cell is filtered out and becomes a background noise.

2. The particle monitoring system of claim 1, wherein the laser beam is a structured beam.

3. The particle monitoring system of claim 2, wherein the structured laser beam is a structured dark beam.

4. The particle monitoring system of claim 1, configured to record the differential signal of the first and second signals.

5. The particle monitoring system of claim 1, configured to record a summed signal of the first and second signals.

6. The particle monitoring system of claim 1, wherein the laser beam is configured such that a focal region of the structured laser beam occurs in the particle interrogation region.

7. The particle monitoring system of claim 1, wherein the flow cell comprises a cuvette.

8. The particle monitoring system of claim 1 comprising a processor configured to carryout algorithms to analyze the first and second signals.

9. The particle monitoring system of claim 1, wherein the validation filter is configured to validate that a particle crossed a focal region of the beam by analyzing whether the first and second forward scatter signals appear simultaneously.

\* \* \* \* \*